UNITED STATES PATENT OFFICE.

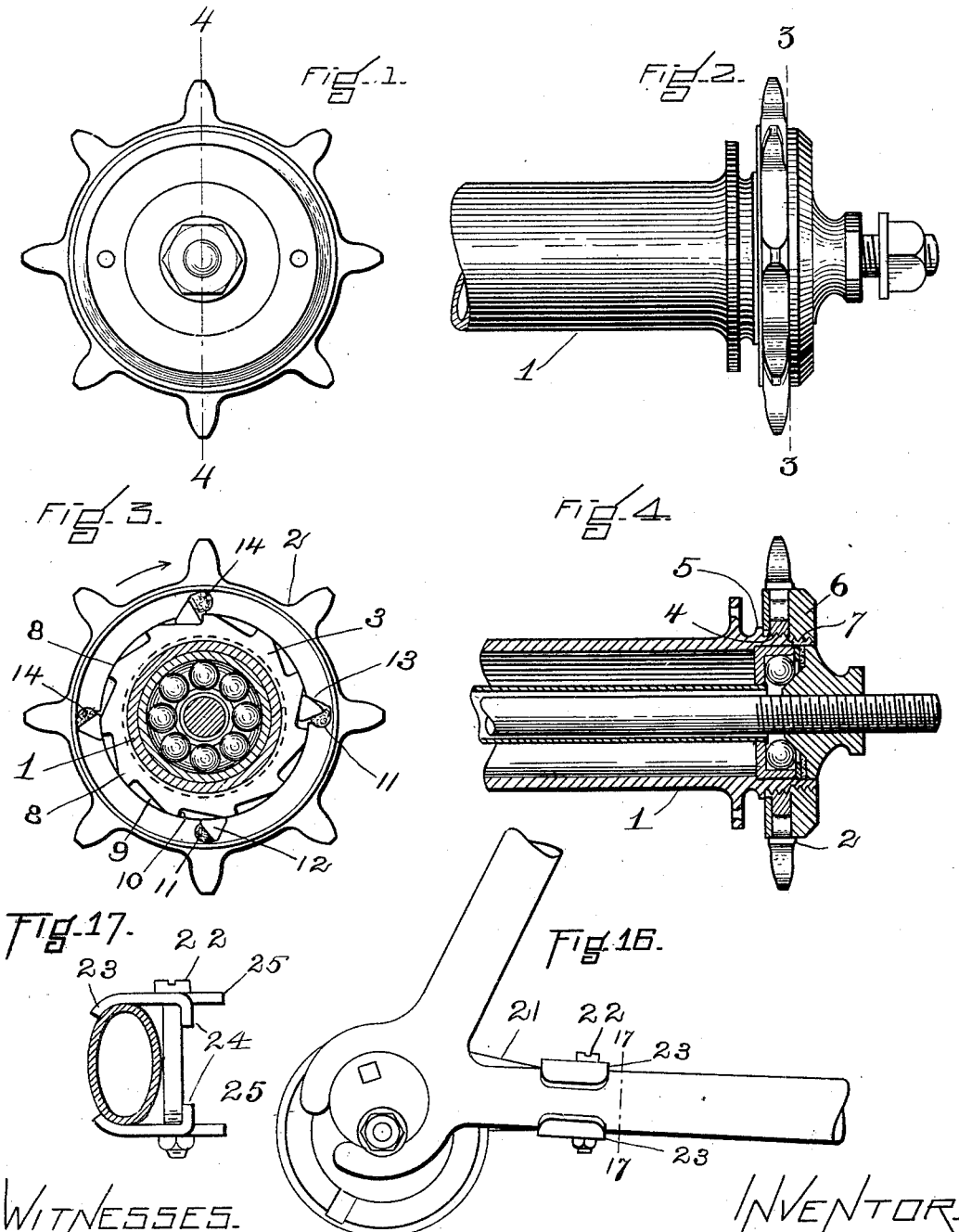

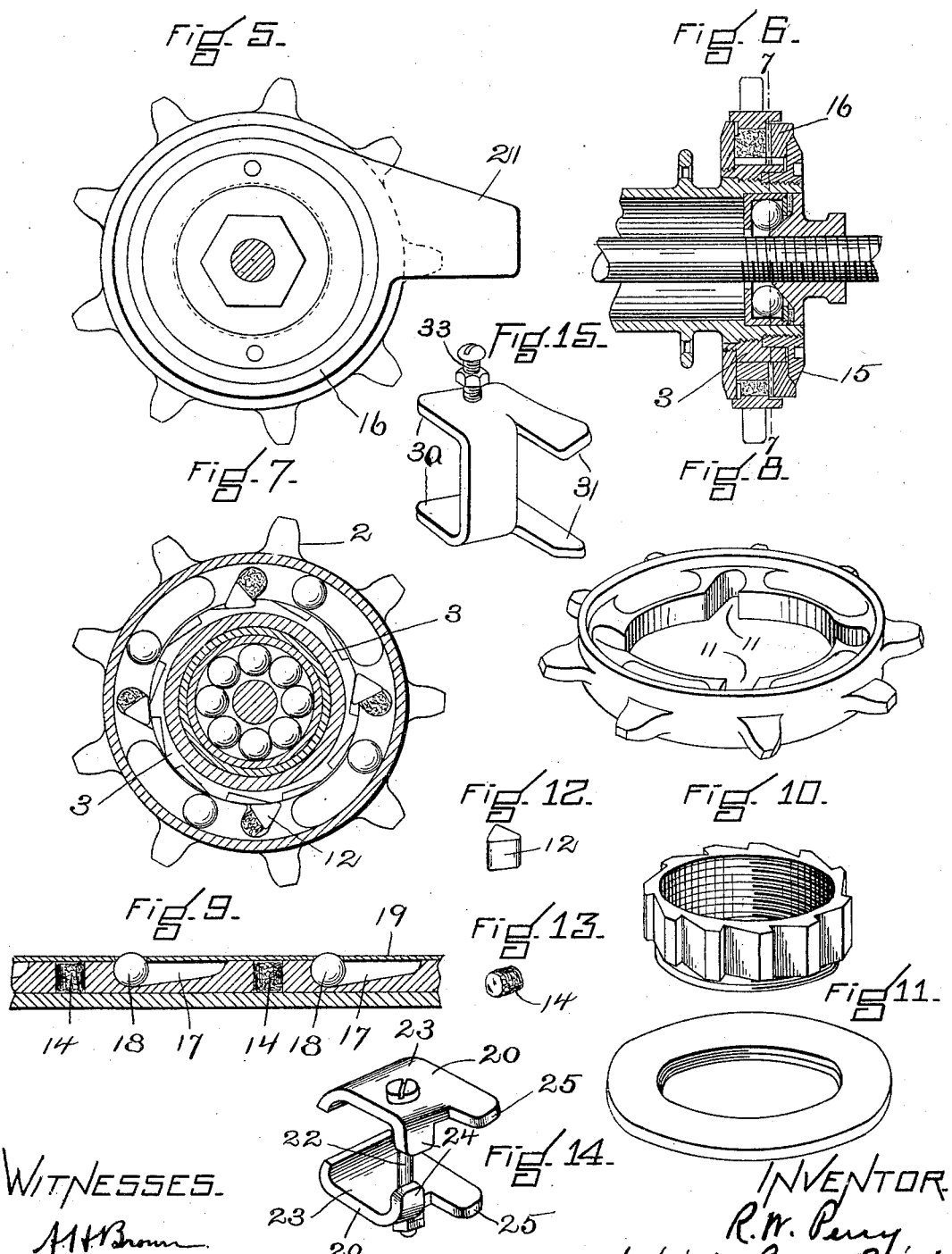

REUBEN W. PERRY, OF WALTHAM, MASSACHUSETTS.

FREE-WHEEL CLUTCH AND BRAKE.

SPECIFICATION forming part of Letters Patent No. 688,262, dated December 3, 1901.

Application filed October 27, 1900. Serial No. 34,590. (No model.)

*To all whom it may concern:*

Be it known that I, REUBEN W. PERRY, of Waltham, in the county of Middlesex and State of Massachusetts, have invented certain new and useful Improvements in Free-Wheel Clutches and Brakes, of which the following is a specification.

This invention relates to automatic clutches of the kind particularly adapted for employment in bicycle driving devices of the free-wheel variety, the clutch being ordinarily combined with a brake which is set by back-pedaling.

The invention has for its object to improve the clutch construction and also to provide improvements in the brake construction, as will more fully hereinafter appear.

Of the accompanying drawings, forming a part of this specification, Figure 1 represents an end view of a hub provided with my improved clutch. Fig. 2 represents an elevation of said hub. Fig. 3 represents a section on the line 3 3 of Fig. 2. Fig. 4 represents a section on the line 4 4 of Fig. 1. Fig. 5 represents an end view of a hub provided with my improved clutch combined with an improved form of brake. Fig. 6 represents a longitudinal section of one end of the hub. Fig. 7 represents a section on the line 7 7 of Fig. 6. Fig. 8 represents a perspective view of the sprocket. Fig. 9 represents a section on an arc through the brake-setting device. Fig. 10 represents a perspective view of the inner clutch member. Fig. 11 represents a perspective view of a washer employed. Figs. 12 and 13 represent, respectively, views of one of the locking-dogs and the member which projects it into locking position. Fig. 14 represents a perspective view of an improved form of clip. Fig. 15 represents another form of clip. Fig. 16 represents an end elevation of a hub and a portion of the frame, showing the location of the clip. Fig. 17 represents a section on line 17 17, Fig. 16.

The same reference characters indicate the same parts in all the figures.

Referring to the drawings and for the present to Figs. 1 to 4, inclusive, 1 represents the hub of a bicycle or similar vehicle, and 2 represents a sprocket-wheel mounted on said hub. The inner portion of said sprocket-wheel constitutes one member of a driving-clutch, the other member of said clutch being represented at 3 and consisting of a toothed sleeve or collar screwed upon a threaded portion 4 of the hub 1 and held against a shoulder 5 of said hub by means of a nut 6, which screws upon another threaded portion 7 of the hub of smaller diameter than the threaded portion 4. The threaded portions 4 and 7 are such as are ordinarily found on bicycle-hubs, and my improvement is adapted to be applied to hubs which are already in use without changing the form of the hub. Each of the teeth 8 8 of the member 3 is formed with a slanting back 9 and an abrupt face 10. In the body of the sprocket 2 are tangentially formed a series of pockets 11 11, each of which is occupied by a locking-dog 12, of prismatic form and triangular section. Each pocket is provided with a wall or abutment 13, which, owing to the tangential formation of the pocket, is substantially parallel to the abrupt faces 10 of the teeth 8 when said teeth are opposite the mouth of the pocket. The inner face of the sprocket 2 is cylindrical, except where interrupted by the pockets 11 11, and the crests of the teeth 8 8 lie close to said cylindrical portion. When the sprocket 2 is stationary and the hub 1 rotates in the direction of the arrow in Fig. 3, the dogs 12 will be forced by the inclined backs of the teeth 8 bodily outwardly into the pockets 11 11, as represented at the lower and left-hand portions of Fig. 3. When, however, the sprocket 2 starts to rotate relatively to the hub 1 in the direction of the arrow, Fig. 3, some of the dogs 12 12 will be caught between an abutment 13 and the abrupt face 10 of one of the teeth and will thereby positively lock the sprocket 2 to the member 3.

It will be noted in Fig. 3 that the spaces between pockets 11 are non-multiples of the spaces between teeth 8, so that when one dog is in engaging relation to a tooth the other dogs are each between two engaging positions and at different distances from the flanking teeth. The catch or "bite" of the clutch is therefore almost immediate from any relative position of the clutch members. When a dog is in locking position, one of its faces lies against an abutment 13 and another face lies against a tooth-back 9, while the corner formed between the last said face and the third face engages the abrupt face 10 of the tooth, thus giving an ample surface of contact to reduce wear to the minimum and prevent digging or pitting of the metal. This is due to the fact that the dogs move bodily instead of being pivoted in the pockets. Against the third face of each dog a resilient dog-projecting member 14 bears. This member lies in the pocket 11 behind the dog 12 and is confined therein by the dog, and I prefer to make it of some material, such as felt, which has a certain degree of resiliency sufficient to provide the slight inward-yielding pressure required to project the dogs and at the same time is absorptive, so as to be capable of retaining a lubricant, such as oil. It will be observed that each of the locking-dogs is of prismatic form, having three equal flat sides. Therefore the operative faces and corners thereof are interchangeable, a flat side being adapted to fit the flat abutment or side 13 of the pocket and a corner being adapted to fit the abrupt face 10 of the tooth 8. Therefore after the first corner is worn down the second and third corners may be brought into use by shifting the position of the dog.

Figs. 5 to 11, inclusive, illustrate the above-described form of clutch combined with a brake. 15 is a brake-disk screwed on the outer end of the hub 1 and serving as a nut to lock the toothed clutch member 3 in place on the hub. 16 is a second brake-disk mounted between the sprocket 2 and the disk 15 and held from rotation by attachment to the bicycle-frame. The outer face of the sprocket 2 is provided with a series of inclines 17 17, which form the bottoms of pockets in which are mounted spherical rollers 18 18, the latter operating between said inclines and the inner face of the non-rotatable brake-disk 16. 19 is a roller-retainer mounted between the sprocket 2 and disk 16. When the rider ceases pedaling, the hub and attached inner clutch member run loose within the sprocket 2, and when he gives the sprocket 2 a slight reverse rotation by backward pedaling the balls or rollers 18 will move up the inclines 17 and force the non-rotatable disk 16, which is capable of a limited lateral movement or movement longitudinally of the wheel-hub, against the rotating disk 15, thereby tending to arrest or brake the wheel.

In Fig. 14 I have represented an improved form of clip for attaching the non-rotatable brake member to the bicycle-frame. The non-rotatable brake-disk 15 is provided with an arm 21, which projects forwardly inside of the bicycle-frame and preferably alongside the lower fork or rear bar thereof. The clip as here shown is made up of upper and lower plates 20 20 and a bolt 22. The plates are formed with frame-gripping jaws 23 23, which embrace the upper and lower sides of the frame-bar when the clip is in place, the bolt 22 lying on the inner side of said bar. The plates are furthermore provided with lips 24 24, which abut against the stem of the bolt and prevent the jaws from opening out when the bolt is screwed up, and with jaws 25 25, which project inwardly and embrace the arm 21 on the brake-disk 15. By this construction the rear wheel can be removed without disturbing the clip, hence avoiding abrasion of the frame, and, if desired, the clip can be removed or adjusted without removing the wheel.

In Fig. 15 I show another form of clip for attaching the non-rotatable brake member to the bicycle-frame. Said clip is made of a single piece of metal bent to form two frame-embracing jaws 30 30 and two inwardly-projecting jaws 31 31, which embrace the end of the arm 21. The clip is attached to the frame by means of the set-screw 33, screwed through the upper jaw and bearing against a shoe 34, which is curved to fit the frame-bar on which it bears.

With either form of clip shown there is a loose or slotted connection between the frame-clip and the arm of the non-rotatable brake-disk. The space between the jaws 25 25 or the jaws 31 31 constitutes a slot which receives the end of the arm 21. This permits the rear wheel to be withdrawn without disturbing the clip and would also allow the arm 21 to assume slightly-different angles with respect to the clip when the end of the arm 21 is narrower than the space between the jaws of the clip. This is sometimes desirable in the adjustment of parts on some makes of bicycles.

I claim—

1. An automatic driving-clutch comprising outer and inner relatively rotatable members, one being toothed and the other having one or more pockets, a prismatic locking-dog having equal flat sides and occupying each pocket and adapted to positively lock the members together, and means for yieldingly projecting the dog into locking position.

2. An automatic driving-clutch comprising outer and inner relatively rotatable members, one being toothed and the other having one or more pockets, a prismatic locking-dog having three equal flat sides and occupying each pocket and adapted to positively lock the members together, and the dog-projecting device located in said pocket behind the dog and yieldingly projecting the latter into locking position.

3. In combination with the frame and rear wheel, a brake having a non-rotatable brake member provided with an arm, and a clip fast to the frame said frame and clip having a slotted or loose connection with each other whereby the rear wheel and brake-arm may be removed without disturbing any part of the clip.

4. A clip for rear-wheel brakes comprising means for adjustable attachment to the frame-tube and a pair of parallel jaws adapted to embrace an arm of a brake member, means being provided for insuring parallelism of the jaws under all degrees of adjustment.

5. A clip for rear-wheel brakes comprising two plates having frame-bar-gripping jaws, a bolt adapted to draw said plates together, lips abutting against the bolt-stem, and jaws adapted to embrace an arm of a brake member.

6. An automatic driving-clutch comprising outer and inner relatively rotatable members having suitable abutments, and locking-dogs between said abutments, said locking-dogs being of prismatic form having three equal flat sides whereby the operative faces and corners of the dogs are interchangeable.

In testimony whereof I have affixed my signature in presence of two witnesses.

REUBEN W. PERRY.

Witnesses:
C. F. BROWN,
E. BATCHELDER.